US012602337B2

(12) United States Patent
Kang et al.

(10) Patent No.: US 12,602,337 B2
(45) Date of Patent: Apr. 14, 2026

(54) METHOD FOR SAFELY DESIGNING AND IMPLEMENTING INTERCONNECT FOR DISAGGREGATED SYSTEM

(71) Applicants: Korea Advanced Institute of Science and Technology, Daejeon (KR); Research & Business Foundation SUNGKYUNKWAN UNIVERSITY, Gyeonggi-do (KR)

(72) Inventors: Brent ByungHoon Kang, Daejeon (KR); Daegyeong Kim, Daejeon (KR); Geonwoo Kim, Daejeon (KR); Eunjin Kim, Daejeon (KR); Wonwoo Choi, Daejeon (KR); Chang-il Lim, Daejeon (KR); Youngkwang Han, Daejeon (KR); Hojoon Lee, Gyeonggi-do (KR)

(73) Assignees: Korea Advanced Institute of Science and Technology, Daejeon (KR); Research & Business Foundation SUNKYUNKWAN UNIVERSITY, Gyeonggi-do (KR)

( * ) Notice: Subject to any disclaimer, the term of this patent is extended or adjusted under 35 U.S.C. 154(b) by 368 days.

(21) Appl. No.: 18/688,901

(22) PCT Filed: Aug. 2, 2021

(86) PCT No.: PCT/KR2021/010071
§ 371 (c)(1),
(2) Date: Mar. 4, 2024

(87) PCT Pub. No.: WO2022/149680
PCT Pub. Date: Jul. 14, 2022

(65) Prior Publication Data
US 2025/0004958 A1 Jan. 2, 2025

(30) Foreign Application Priority Data

Jan. 5, 2021 (KR) ........................ 10-2021-0001091
May 18, 2021 (KR) ........................ 10-2021-0064081

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ............................. G06F 13/20; G06F 2213/40
(Continued)

(56) References Cited

U.S. PATENT DOCUMENTS 6,538,416 B1 * 3/2003 Hahne ................... H04L 47/827
370/431
6,954,436 B1 * 10/2005 Yip ....................... H04L 45/123
370/254
(Continued)

FOREIGN PATENT DOCUMENTS

EP 3968733 A1 * 3/2022 .......... H04L 49/602
KR 10-2015-0048835 8/2019
(Continued)

OTHER PUBLICATIONS

International Search Report and Written Opinion for International Publication No. PCT/KR2021/010071, mailed Nov. 2, 2021.

*Primary Examiner* — Anthony Mejia
(74) *Attorney, Agent, or Firm* — CHRISTENSEN O'CONNOR JOHNSON KINDNESS PLLC

(57) ABSTRACT

A method for safely designing and implementing an interconnect for a disaggregated system is disclosed. The method for designing and implementing an interconnect for a disaggregated system, according to an embodiment, may comprise the steps of: configuring an interconnect for a disag-
(Continued)

gregated system by using a layer-based topology; and managing components of the disaggregated system via a plurality of routers included in the configured interconnect.

14 Claims, 9 Drawing Sheets

(58) Field of Classification Search
USPC ........................................................ 709/238
See application file for complete search history.

(56) References Cited

U.S. PATENT DOCUMENTS

| | | | | |
|---|---|---|---|---|
| 10,454,877 | B2 * | 10/2019 | Fernando | H04L 41/40 |
| 12,113,815 | B1 * | 10/2024 | Haslam | H04L 63/107 |
| 2003/0167342 | A1 * | 9/2003 | Munger | H04L 63/1458 |
| | | | | 709/238 |

FOREIGN PATENT DOCUMENTS

| 2008/0225699 | A1 * | 9/2008 | Lee | H04L 45/586 |
|---|---|---|---|---|
| | | | | 370/389 |
| 2010/0265949 | A1 * | 10/2010 | Cervantes | H04L 47/2483 |
| | | | | 370/392 |
| 2016/0156558 | A1 * | 6/2016 | Hong | H04L 41/122 |
| | | | | 370/237 |
| 2017/0324616 | A1 * | 11/2017 | Johnsen | H04L 45/74591 |
| 2018/0123801 | A1 * | 5/2018 | Hodroj | H04W 84/12 |
| 2019/0386881 | A1 * | 12/2019 | Dutta | H04L 41/12 |
| 2020/0220803 | A1 * | 7/2020 | Zheng | H04L 41/082 |
| 2020/0233817 | A1 | 7/2020 | Dall et al. | |
| 2023/0104568 | A1 * | 4/2023 | Miriyala | H04L 45/42 |
| | | | | 718/104 |
| 2024/0319911 | A1 * | 9/2024 | Kommareddy | G06F 3/0655 |
| 2024/0430204 | A1 * | 12/2024 | Shahdad | H04L 47/24 |

FOREIGN PATENT DOCUMENTS

| KR | 10-2019-0020523 | 9/2019 |
|---|---|---|
| KR | 10-2015-0016309 | 1/2021 |

* cited by examiner 1-2. Delete interconnect configuration information 1-3. Delete message queue item 1-4. Change configuration information to default value <Detailed initialization command process>

Root router

Leaf router

Leaf router

Leaf router

1. Initialization command 2-1. Router ID assignment request 2-2. Router ID assignment response

FIG. 4

Root
(Pool controller)

1. Initialization command
2. Component ID assignment request
3. Component ID assignment response
4. Component information delivery

FIG. 7

```
def onReadPacket(curpkt) :
    packet = curpkt
    // Store brief packet information
    addAbtractEventHistory(packet)
    type = getPktType(packet)
    // CRC check if false == checkCRC(packet):
        return ERR_NUM_CRC_ERR
    // Recognize disaggregated system control information if type == PKT_TYPE_CONTROL_WRITE_RES :
        reqPkt = searchLastHistory(packet.tag)
        if type(reqPkt) != None:
                    saveControlInfo(packet)
    // Access Key Verification if true == has_AccessKey(packet.DCID):
            if packet.accessKey != get_AccessKey(packet.DCID):
                    return ERR_NUM_AKEY_INVALID
    // Region Key Verification if true == has_RegionKey(packet.DCID):
            if packet.RegionKey != get_RegionKey(packet.DCID):
                    return ERR_NUM_RKEY_INVALID
    // Pattern Detection
    if ERR_NUM_BENIGN != (errno = checkpattern(packet)):
            return errno
def checkCRC(packet):
    // Calculate and then verify CRC of packet buf = packet.vc+packet.len
    if packet.pcrc != calculateCRC(buf):
        return false buf = packet.opcode+packet.dcid+packet.scid...
    if packet.ecrc != calculateCRC(buf):
        return false
    return true def checkpattern(packet):

// Return pattern detection results
    if isPatternMatched(packet) == true:
            return errnum else:
            return ERR_NUM_BENIGN
```

FIG. 8

```
// Access Key Brute Forcing
<pattern>
        <pattern id>1</pattern id>
        <type>repeat</type>
        <detail>
                <except>AKey </except>
                <except>ECRC</except>
                <threshold>5</threshold>
                <deadline>3000</deadline>
        </detail>
</pattern>

// DDOS
<pattern>
    <pattern id>2</pattern id>
    <type>repeat</type>
    <detail>
            <except>scid </except>
            <threshold>3000</threshold>
            <deadline>10000</deadline>
    </detail>
</pattern>
```

METHOD FOR SAFELY DESIGNING AND IMPLEMENTING INTERCONNECT FOR DISAGGREGATED SYSTEM

TECHNICAL FIELD

The following description relates to technology for designing and implementing an interconnect required for a safe disaggregated system.

This patent is research conducted with the support of the Institute for Information and Communication Technology and Evaluation (IITP) with funding from the government of the Republic of Korea (Ministry of Science and ICT) (No. IITP-2020-0-00666).

RELATED ART

A disaggregated system refers to a resource-centered approach architecture to solve an issue of wasting network resources (e.g., memory, CPU, accelerator, etc.) found in a machine-centered structure in a cloud, a data center, and the like. The disaggregated system allows a plurality of machines to share a plurality of resources, improving the efficiency of resource access. Due to this characteristic, the disaggregated system is attracting attention as next-generation technology in the field of a cloud, a data center, and the like. A service provider entrusts storage and processing of customer and user data in a cloud environment and, to protect user data, it is necessary to proactively respond to important security tasks, such as confidentiality, integrity, and availability for a service.

There have been no public examples of the disaggregated system to date and the disaggregated system is being developed by the Gen-Z Consortium established by some industry-academic organizations and by companies such as HP and Intel. Among them, the Gen-Z Consortium has released detailed technical specifications for the Gen-Z system, one of disaggregated systems, for developers. However, since these Gen-Z detailed specifications have never been actually implemented, it is impossible to know additional considerations that are required or a security issue that may arise in a system actually implemented according to the Gen-Z specifications. Moreover, since many aspects are left to a selection of a system designer, there is a need to consider a more specific form of the disaggregated system.

DETAILED DESCRIPTION

Technical Subject

Example embodiments may provide a method and system for safely designing and implementing an interconnect used in a disaggregated system.

Example embodiments may provide a method and system for proposing a configuration of an interconnect to improve a security of a disaggregated system and detecting a security threat through a security monitor.

Technical Solution

According to an aspect, there is provided a method of designing and implementing an interconnect for a disaggregated system, the method including configuring the interconnect for the disaggregated system using a hierarchical topology; and managing components of the disaggregated system through a plurality of routers included in the configured interconnect.

The managing may include detecting an abnormality and an attack on the disaggregated system using a security monitor connectable to the plurality of routers included in the interconnect.

The configuring may include generating the interconnect that connects the plurality of routers by configuring the hierarchical topology using a fat tree form, and the plurality of routers may include a root router and a leaf router.

The configuring may include configuring a topology by initializing the root router to the leaf router through an operation of sending an initialization command from the root router to the leaf router, emptying a message queue of the root router in response to initializing leaf router information stored in the root router and then initializing a state of the root router, and inspecting a status of the initialized root router to determine an abnormality status, and by registering information of routers connected to the interconnect.

The configuring may include sending a router ID assignment request packet from a router connected to the interconnect to each router, detecting a newly connected leaf router at the root router in response to the sent router ID assignment request packet reaching the root router, assigning a router ID to the detected leaf router, recording the assigned router ID in a response packet and sending the same to the detected leaf router, and storing the assigned router ID and router information in the root router.

The configuring may include configuring a routing table using a manual routing method of specifying a route to a destination or an automatic routing method of searching for a route by traversing a fat-tree topology in reverse order, while starting from the leaf router.

The managing may include configuring a pool by classifying the components of the disaggregated system by type through a role of a pool controller that is performed by a leaf router of the interconnect and managing the pool according to characteristics of the components classified in the configured pool.

The managing may include performing pool initialization through initialization of the pool controller and the components included in the pool controller, assigning a component ID to each component in response to a component ID assignment request sent from a component classified in the pool using the pool controller, sending a response packet that includes the assigned component ID to the component, storing component information acquired from a packet related to the component ID assignment request, and notifying an upper router of the stored component information.

The managing may include verifying whether a destination component is included in the pool configured by the pool controller using a packet sent from a departure component, using the pool controller, and delivering the packet sent from the departure component to the destination component when the destination component is verified to be present in the pool configured by the pool controller.

The managing may include delivering the packet sent from the departure component to the upper router when the destination component is verified to be absent in the pool configured by the pool controller.

The detecting may include initializing the security monitor by reading a storage device connected to the security monitor and by loading a threat detection pattern.

The detecting may include performing an access key verification on a packet input to the security monitor by storing access key information in the security monitor.

The detecting may include performing a cyclic redundancy check (CRC) verification by calculating a CRC value of the entire packet or a designated region and by comparing a CRC hash value stored in a field of the packet and the calculated CRC value.

The detecting may include detecting an abnormal packet using a combination and values of specific fields of a packet as a pattern.

According to an aspect, there is provided a computer system to design and implement an interconnect for a disaggregated system, the computer system including at least one processor configured to execute computer-readable instructions included in a memory, wherein the at least one processor is configured to configure the interconnect for the disaggregated system using a hierarchical topology and to manage components of the disaggregated system through a plurality of routers included in the configured interconnect.

Effect

According to some example embodiment, it is possible to improve performance of a disaggregated system by decreasing the bottleneck that occurs in a root router by configuring an interconnect in a form of a fat tree and by improving a response speed of the root router using a characteristic of the fat tree.

According to some example embodiments, it is possible to add a function suitable for a characteristic of each device to a router by configuring devices of the same type into a single pool and to perform efficient management.

According to some example embodiments, it is possible to increase a response time of a router by configuring a security function for which the router is responsible using separate hardware and to simultaneously perform a security function and a route search by operating a security monitor and the router in parallel.

BRIEF DESCRIPTION OF DRAWINGS

FIG. 4 illustrates a pool configuration according to an example embodiment.

FIG. 7 illustrates a packet verification code of an interconnect according to an example embodiment.

FIG. 8 illustrates an example of a pattern of a packet according to an example embodiment.

BEST MODE

Hereinafter, example embodiments will be described in detail with reference to the accompanying drawings.

The example embodiments propose a configuration of an interconnect to improve security of a disaggregated system and describe a security monitor to detect a security threat. Through three methods including (1) an interconnect configuration method, (2) a control and management method using a component pool and a pool controller, and (3) a method of detecting an abnormality and an attack on a disaggregated system using a security monitor connected to an interconnect, described is an operation of implementing an efficient interconnect capable of responding to a security threat, suitable for a device that belongs to a disaggregated system.

Figure 1:
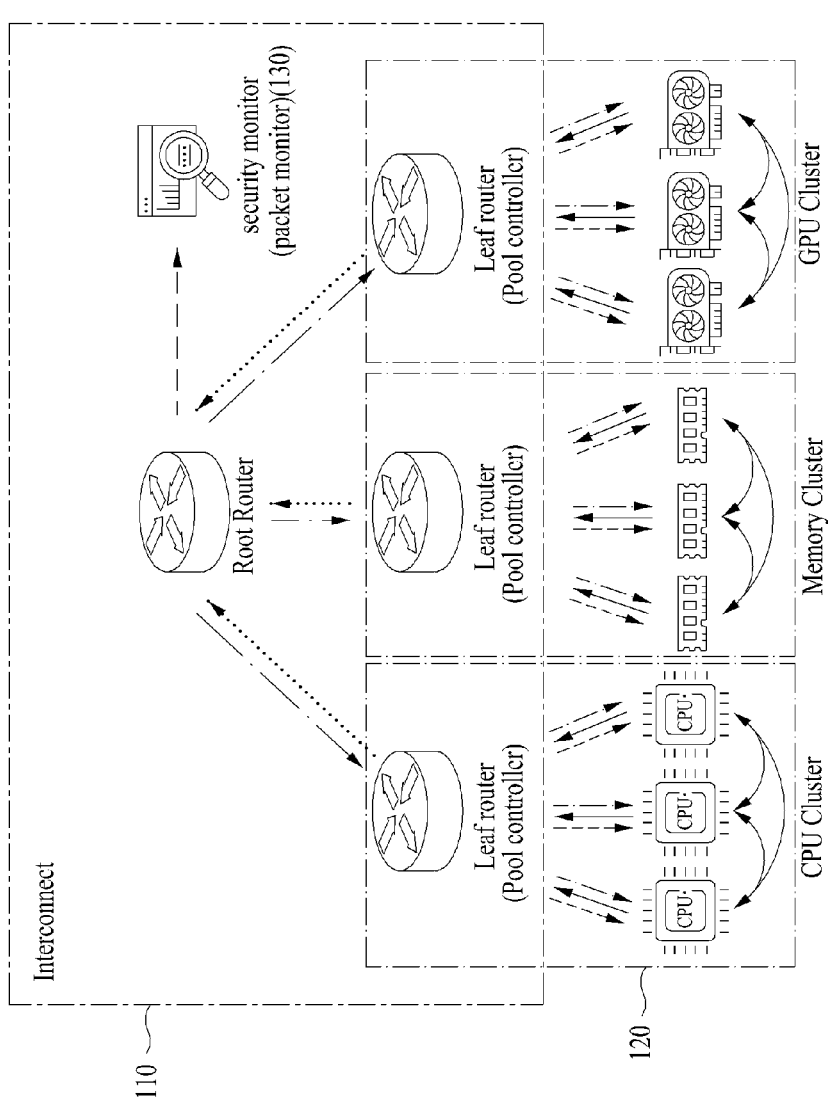
FIG. 1 illustrates a configuration of a computer system according to an example embodiment.

FIG. 1 illustrates a configuration of a computer system according to an example embodiment.

A computer system is to improve security of a disaggregated system and may include an interconnect 110, a pool controller 120, and a security monitor 130.

The interconnect 110 for the disaggregated system may configure a hierarchical topology in a form of a fat tree to reduce performance load. The interconnect 110 may connect a plurality of switches (or routers) based on the configured topology.

The pool controller 120 may collect devices (components) that constitute the disaggregated system by type and may manage the same according to characteristics of the devices (components). Here, the pool controller 120 may represent the plurality of switches (or routers) connected to the interconnect 110.

As the security monitor 130 configured as separate hardware is connected to the switches (or routers) that constitutes the interconnect 110, an abnormality and an attack on the disaggregated system may be detected to safely operate the disaggregated system.

Figure 2:
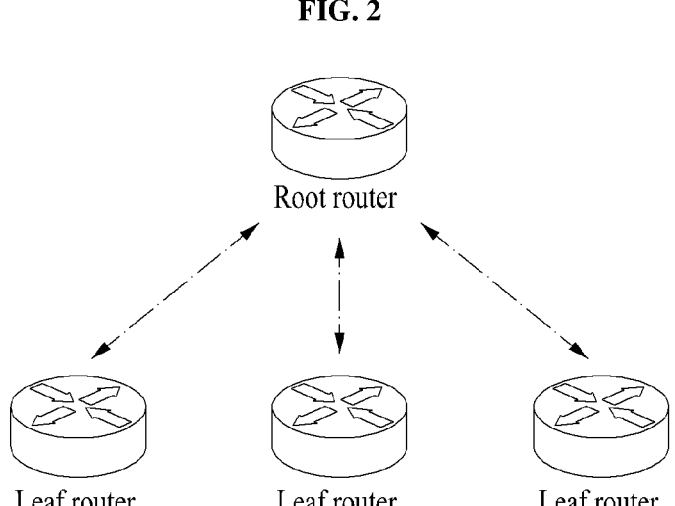
FIG. 2 illustrates a configuration of an interconnect according to an example embodiment.

FIG. 2 illustrates a configuration of an interconnect according to an example embodiment.

The interconnect may implement a hierarchical switch (router) using a fat tree data structure for a plurality of routers (switches). The interconnect may be configured using a fat-tree topology. A switch or a router may be connected to the interconnect. An example embodiment is described based on an example of the interconnect in which the plurality of routers are connected. Also, in the fat-tree topology, a router corresponding to a root node is referred to as a root router and a router located at a terminal node is referred to as a leaf router.

The leaf router of the fat tree serves as a pool controller of a device. In an example embodiment, a pool may be generated and managed by collecting devices of the same type into one. Such pools may be implemented by connecting the same type of devices to a leaf router and a router of each pool may perform routing and control functionality inside a corresponding pool. The range of the interconnect includes a root router and a pool controller.

Figure 3:
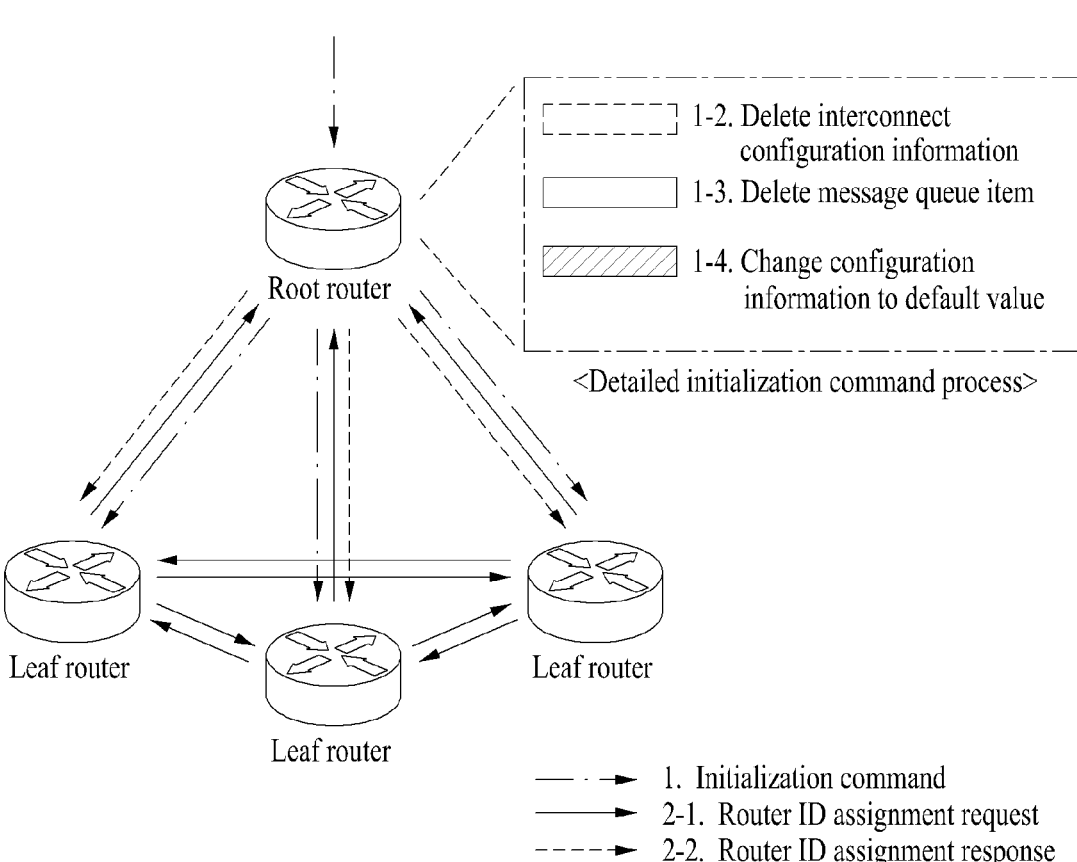
FIG. 3 illustrates an interconnect initialization and router addition operation according to an example embodiment.

FIG. 3 illustrates an interconnect initialization and router addition operation according to an example embodiment.

An interconnect may perform an interconnect initializing operation, a switch adding and removing operation, and a routing table configuring and routing operation.

(1) Interconnect Initializing Operation

Initialization of the interconnect refers to a router initialization process that proceeds sequentially from a root router to a leaf router. The root router may be initialized. A first operation to be performed when initializing the root router is to send an initialization command to the leaf router. Then, after initializing leaf router information stored in the root router, a message queue of the root router may be emptied and then, a state of the root router may be initialized. Lastly, a status of the root router may be inspected to determine an abnormality status. Additionally, if a configuration file input to the root router is present, corresponding settings may be applied.

When the root router is being initialized, lower routers and devices need to stop tasks, such as sending a packet, and to wait. During initialization, the root router is incapable of performing tasks, such as packet delivery, lower router management, etc. Here, if a lower router is still operating, side effect, such as message loss, is likely to occur. Accordingly, lower routers need to be in a standby state without performing packet delivery until initialization of the root router is completed.

When the interconnect is initialized, topology configuration information and each router may also be initialized and connected router and device information may be removed. Once initialization is completed, a new topology needs to be configured by registering information of a connected router.

(2) Router Adding and Removing Operation

A leaf router itself may request a router ID assignment and be registered to a topology. Topology information may be reset, or a newly connected router may not know the entire topology configuration. Therefore, a router belonging to the interconnect may send a component ID assignment request packet to all connected routers. The sent component ID assignment request packet may ultimately reach the root router and the root router may detect the newly connected leaf router through the component ID assignment request packet. The root router may assign a unique router ID to the detected leaf router and may record the router ID assigned to the leaf router in a response packet. The root router may send, to the leaf router, the response packet in which the router ID is recorded. The root router may store the assigned router ID and router information. This router ID and router information may be used to maintain configuration information of devices connected to the interconnect and to search for a route of a packet in the future.

(3) Routing Table Configuring and Routing Operation

A method of configuring a routing table may include a manual routing method of specifying a route to a destination or an automatic routing method of starting from a leaf router and searching for a route by traversing a fat-tree topology in reverse order.

The manual routing method is to directly specify the route to the destination through the configuration file. The automatic routing method is to search for the route by traversing the fat tree in reverse order, starting from a router. Since the topology of the interconnect for the disaggregated system according to an example embodiment uses a fat tree, leaf routers present in the same level in a tree are not connected to each other and are connected only to the root router. Therefore, a packet needs to be delivered to the root router to deliver the packet to a component connected to another leaf router.

In an example embodiment, the topology is represented as a basic fat tree that includes two levels. However, in the case of configuring the topology using the fat tree of two or more levels, a packet needs to be delivered to an upper router until the packet is delivered to a router in which destination information is present. When the root router (or an upper router with destination information) receives the packet, the root router may deliver the packet to a lower router to which a destination component is connected. When a router to which the destination component is directly connected receives the packet by repeating this process, the router to which the destination component is directly connected may finally deliver the packet to the destination component.

According to an example embodiment, it is possible to reduce the bottleneck occurring in a root router by configuring an interconnect in a fat tree form. Since the root router needs to process all packets excluding a packet to be delivered within a pool, a processing delay time may increase due to the bottleneck. To solve this, the fat tree may be used as a topology of the interconnect. In a network, a tree refers to a topology in which a connection point (link) of each node has the same bandwidth. Here, the higher in the tree, the more bottleneck occurs, which leads to increasing a delay rate of the entire network. The fat tree improves shortcomings of the tree and allows a large bandwidth to be used at a connection point connected to a root node. Expansion of the bandwidth may resolve the bottleneck occurring in the root node. In an example embodiment, it is possible to improve the performance of the entire disaggregated system by enhancing a response rate of a root router using characteristics of a fat tree.

Figure 4:
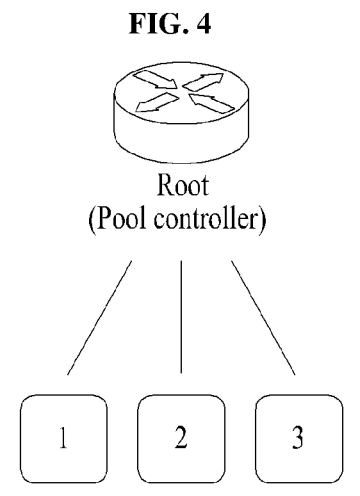

FIG. 4 illustrates a pool configuration according to an example embodiment.

For management and security tailored to characteristics of a device (component), devices (components) may be classified by type and characteristic and configured as a pool and devices (components) classified in the configured pool may be managed. For example, all central processing units (CPUs) belonging to a disaggregated system may be grouped into one and may be managed as a CPU pool. The pool uses a cluster data structure and may maintain and add each device (component). A cluster basically refers to a structure that groups a plurality of computers to operate as one. The cluster generally guarantees superior performance and stability to a single computer. In an example embodiment, the cluster groups devices of the same type that are not computers into one to operate as a single device. It represents that it may be used as a resource of the disaggregated system and may be distributed as a resource of a virtual machine belonging to the disaggregated system. Each pool is maintained by a leaf router of an interconnect for the disaggregated system and each leaf router serves as a pool controller. The pool controller may serve to interpret a packet delivered from a root router and to deliver the packet to a destination device belonging to the pool.

Figure 5:
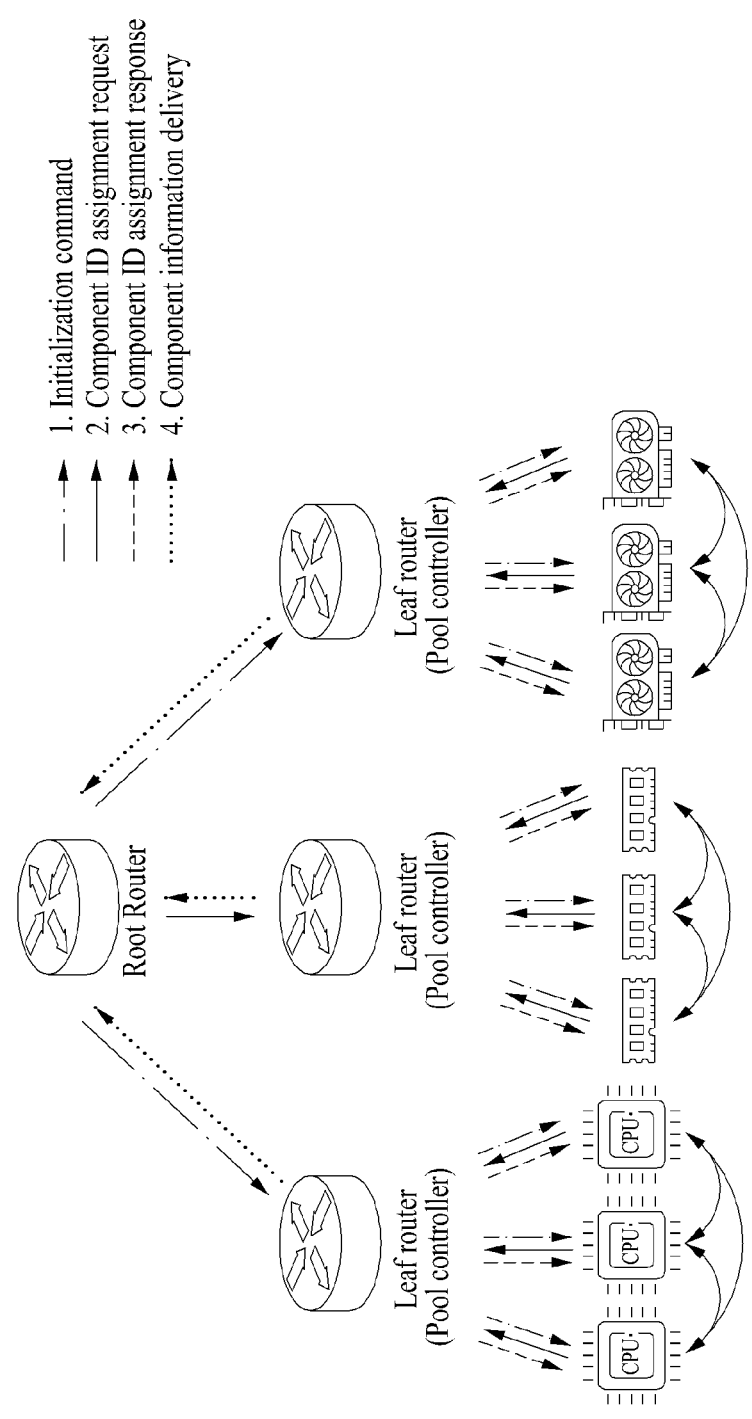
FIG. 5 illustrates a pool initialization and pool addition operation according to an example embodiment.

FIG. 5 illustrates a pool initialization and pool addition operation according to an example embodiment.

A device pool configuring and managing operation may include a pool initializing operation, a pool component adding and removing operation, and a pool routing operation.

Hereinafter, a device included in a pool is described as a component.

(1) Pool Initializing Operation.

Pool initialization may initialize a pool controller and components belonging to the pool. The pool controller is a leaf router in a fat-tree topology of an interconnect and gives an initialization command to each pool component. Component initialization represents resetting each component and changing a status and settings to default settings. Since an initializing operation for each component varies depending on a model, a version, and a manufacturer of a corresponding component, further description is omitted.

(2) Pool Component Adding and Removing Operation

Each component may receive a component ID from the pool controller. The pool controller may assign a component ID to each component in response to a component ID assignment request delivered from each of components included in the pool, and may send a response packet including the assigned component ID to the component having sent the component ID assignment request. Also, the pool controller may store component information acquired from a component ID assignment request packet and may notify an upper router of the component information.

If the pool is initialized, there may be no component belonging to the pool, or a newly connected component needs to be assigned a component ID from the pool controller. Since a component cannot know a configuration of the pool, the component may send a component ID assignment request to all members of the pool. As a result, the pool controller may receive the component ID assignment request and may record the assigned component ID in the response packet. The pool controller may send the response packet in which the assigned component ID is recorded to the component having requested the component ID assignment. The pool controller may store component information and may report the component information to an upper router.

Figure 6:
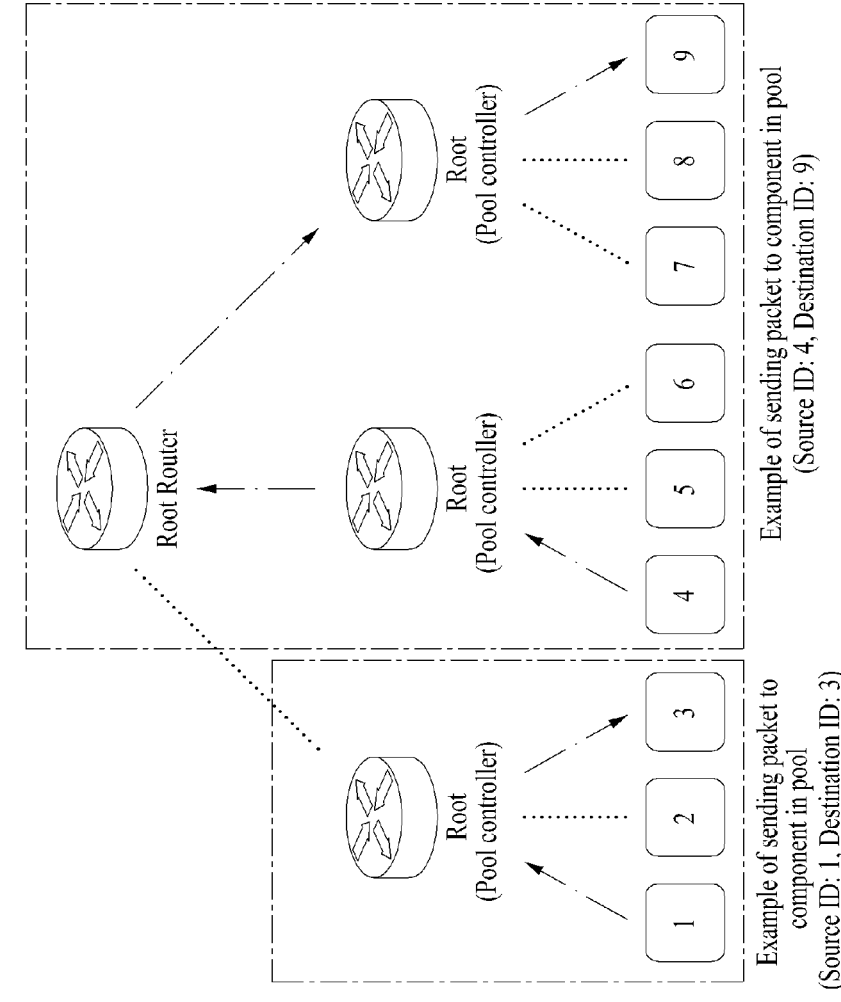
FIG. 6 illustrates an interconnect and pool routing operation according to an example embodiment.

FIG. 6 illustrates an interconnect and pool routing operation according to an example embodiment.

(3) Finding a Route in a Pool (Routing)

A pool controller is responsible for finding a route in a pool. A packet may be sent from a departure component to the pool controller. The pool controller may verify whether a destination component belongs to the pool. If the destination component is present in the pool, the packet may be delivered to the destination component and if the destination component is absent in the pool, it may not be resolved through routing in the pool, so the packet may be delivered to an upper router.

According to an example embodiment, since components of the same type are configured as a single pool, it is possible to perform efficient management by adding a function tailored to a characteristic of each component to a router.

FIG. 7 illustrates a packet verification code of an interconnect according to an example embodiment.

Using a security monitor connectable to a plurality of routers included in the interconnect, an abnormality and an attack on a disaggregated system may be detected. The security monitor of the router-connectable disaggregated system is described. The security monitor may be configured using a field programmable gate array (FPGA) and may perform an access key verification, a CRC verification, and an attack detection by inspecting a field of a packet that reaches a router.

The security monitor may be connected to the router using input/output (I/O) equipment. The router needs to support input and output of the I/O equipment. The security monitor and the router support two inputs and outputs. First input and output is a control signal and is used as a command channel that informs the intent of delivering a packet delivery event and packet inspection results. Second input and output is a data signal and is used as a data exchange channel that informs packet sending and packet inspection results. When a packet is received in a queue, the router notifies the arrival of the packet through the control signal. The router may receive a signal may receive the packet through the data signal. The router may interpret the packet, may request the router to write packet inspection results in a designated region using the control signal, and may deliver inspection results to the designated region of the router using the data signal.

The security monitor has an event history buffer that records information on a predetermined number of packets. Summary information of a packet corresponding to a designated operation among packets delivered to the router may be maintained in the event history buffer by a preset number. A method of managing the event history buffer includes a method of deleting items in oldest order and a method of deleting items after a certain period of time elapses.

The event history buffer may be used to maintain a state of a system to detect an abnormal behavior applied to the disaggregated system or to identify control information of the disaggregated system required to perform a function. A plurality of event history buffers may be present according to the importance of a packet. The method of managing the event history buffer may be selected according to the purpose. For example, a preset number of event history buffers for attack detection may be maintained and if the number of event history buffers exceeds the preset number, items may be deleted in oldest order. The event history buffer for identifying control information of the disaggregated system may be managed by setting a deadline and by removing items from a buffer after the set time.

The security monitor may be installed only in the root router or may be installed in all routers that constitute the interconnect, depending on the purpose. For example, if the entire interconnect needs to be monitored, the security monitor may be installed in the root router, and if security monitoring is required for a specific pool, the monitor may be installed in a pool controller.

The security monitor may safely perform an access key and region key verifying operation and a CRC verifying operation in an environment in which a security method is separate. Also, the security monitor may additionally prevent an attack using a pattern of a specific field.

(1) Monitor Initializing Operation

Monitor initialization may set a status and a setting value of a monitor to default settings. Here, status information managed in the monitor may also be reset. In an initialization stage of the monitor, a threat detection pattern may be loaded by reading a storage device connected to the monitor. The monitor initialization needs to be completed when the disaggregated system is stopped and thus, needs to be performed just before initializing the interconnect.

(2) Access Key and Region Key Verifying Operation

The security monitor may read an access key or region key field of a packet and may verify whether it is valid. A verification routine of an access key and a region key may vary for each component of the system. For example, the security monitor may verify whether an access key is available in a corresponding device and then verify whether an access key of a requester packet matches an access key of a responder device and may succeed in access key verification if they match and may fail in the access key verification and return an error if they mismatch.

In an example embodiment, the security monitor may perform an access key verification on a packet that is received after storing access key information. When a control write packet of the disaggregated system is received, the security monitor may analyze a packet and may record information required for a function performed by the security monitor. The security monitor may acquire access key information by tracking a control write request and response packet for an access key. When a response packet for an access key setting is received in a router, the security monitor may analyze an error code. If the error code is normal, the security monitory may verify an event history buffer and may search for a control write request for the access key. When a request packet for a response is found, results of analyzing an access key that maps a region of a corresponding device may be stored in the security monitor. Afterwards, if a request packet for the region of the corresponding device is received in the router, the security monitor may perform access key verification through comparison to the stored access key information.

(3) CRC Verifying Operation

CRC verification may be performed by calculating a CRC value of the entire packet or a designated region and then comparing the calculated CRC value to a CRC hash value stored in a field of the packet. If the CRC value does not match, the packet may be processed by notifying the router of a CRC message error.

A PCRC field refers to a field that stores CRC values of VC and Len fields. The security monitor may store a CRC value of VC and Len field data in the packet. Here, the stored CRC value may be compared to a value of the PCRC field. If they do not match as comparison results, verification results and a failure error code may be returned to the router.

(4) Other Attack Detecting Operation.

FIG. 8 illustrates an example of a pattern of a packet. An abnormal packet may be detected using a combination and values of specific fields of the packet as a pattern. If a specific value is included in a specific field of the packet, whether the packet is abnormal may be determined based on the specific value. Packets may be patterned and if a packet with a matching pattern is present, information on this packet and an error may be notified to a router such that the packet may be processed.

A security monitor may detect a persistent attack by storing a designated number in an event history buffer. The security monitor may detect the persistent attack using an attack pattern that occurs during a specific period using the event history buffer. For example, if a packet with the same contents excluding an access key field appears several times during a certain period, it may be known that it is a brute forcing attack on the access key. This packet may be generated into a pattern. That is, a pattern that determines, as abnormal, a case in which a plurality of (e.g., 3000) events occur and the same packet with only an access key field value changed is generated a preset number (e.g., 5) or more may be generated.

The security monitor may input a pattern generated from an administrator and may detect a security threat using the input pattern. A storage device to store the pattern is present in the security monitor. In an initialization process of the security monitor, the pattern may be loaded by reading a storage device connected to a designated port (e.g., USB, SATA, PCIe, etc.). A new security threat may be detected by connecting a storage device in which a user defined pattern is stored.

A form of a packet pattern may vary depending on a selection on implementation and may be implemented using various methods. Referring to FIG. 8, a pattern code of a packet is implemented in an extensible markup language (XML) format as an example.

According to an example embodiment, advantageous performance may be achieved by configuring a security monitor as separate hardware. A router response time may increase by performing a security function for which a router is responsible through separate hardware. Also, since the security function and route search may be simultaneously performed by operating the security monitor and the router in parallel, it is efficient.

Figure 9:
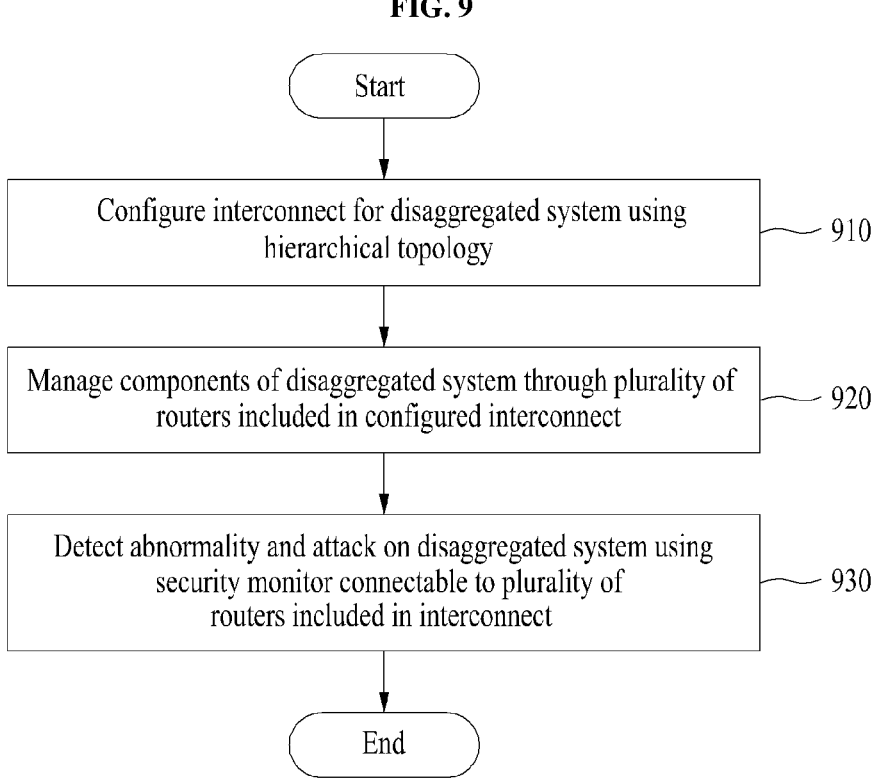
FIG. 9 is a flowchart illustrating a method of designing and implementing an interconnect for a disaggregated system according to an example embodiment.

FIG. 9 is a flowchart illustrating a method of designing and implementing an interconnect for a disaggregated system according to an example embodiment.

In operation 910, a computer system may configure an interconnect for a disaggregated system using a hierarchical topology. The computer system may generate the interconnect that connects a plurality of routers by configuring the hierarchical topology using a fat tree form. The computer system may configure the topology by initializing a root router to a leaf router through an operation of sending an initialization command from the root router to the leaf router, emptying a message queue of the root router in response to initializing leaf router information stored in the root router and then initializing a state of the root router, and inspecting a status of the initialized root router to determine an abnormality status, and by registering information of routers connected to the interconnect. The computer system may send a router ID assignment request packet from a router connected to the interconnect to each router, may detect a newly connected leaf router at the root router in response to the sent router ID assignment request packet reaching the root router, may assig a router ID to the detected leaf router, may record the assigned router ID in a response packet and send the same to the detected leaf router, and may store the assigned router ID and router information in the root router.

In operation 920, the computer system may manage components of the disaggregated system through a plurality of routers included in the configured interconnect. The computer system may configure a pool by classifying the components of the disaggregated system by type through a role of a pool controller that is performed by a leaf router of the interconnect and may manage the pool according to characteristics of the components classified in the configured pool. The computer system may perform pool initialization through initialization of the pool controller and the components included in the pool controller, may assign a component ID to each component in response to a component ID assignment request sent from a component classified in the pool using the pool controller, may send a response packet that includes the assigned component ID to the component, may store component information acquired from a packet related to the component ID assignment request, and may notify an upper router of the stored component information. The computer system may verify whether a destination component is included in the pool configured by the pool controller using a packet sent from a departure component, using the pool controller, and may deliver the packet sent from the departure component to the destination component when the destination component is verified to be present in the pool configured by the pool controller. The computer system may deliver the packet sent from the departure component to the upper router when the destination component is verified to be absent in the pool configured by the pool controller.

In operation 930, the computer system may detect an abnormality and an attack on the disaggregated system using a security monitor connectable to the plurality of routers included in the interconnect. The computer system may initialize the security monitor by reading a storage device connected to the security monitor and by loading a threat detection pattern. The computer system may perform an access key verification on a packet input to the security monitor by storing access key information in the security monitor. The computer system may perform a CRC verification by calculating a CRC value of the entire packet or a designated region and by comparing a CRC hash value stored in a field of the packet and the calculated CRC value. The computer system may detect an abnormal packet using a combination and values of specific fields of a packet as a pattern.

Mode

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be permanently or temporarily embodied in any type of machine, component, physical equipment, virtual equipment, or a computer storage medium or device to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes: optical media such as CD-ROM and DVD; magneto-optical media such as floptical disks; and hardware devices that are specially configured to store program instructions, such as read-only memory (ROM), random access memory (RAM), flash memory, and the like. Examples of program instructions include both machine code, such as produced by a compiler, and files containing higher level code that may be executed by the computer using an interpreter.

While the example embodiments are described with reference to specific example embodiments and drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A method of designing and implementing an interconnect for a disaggregated system, the method comprising:
   configuring the interconnect for the disaggregated system using a hierarchical topology; and managing components of the disaggregated system through a plurality of routers included in the configured interconnect,
wherein the managing comprises configuring a pool by classifying the components of the disaggregated system by type through a role of a pool controller that is performed by a leaf router of the interconnect and managing the pool according to characteristics of the components classified in the configured pool.

2. The method of claim 1, wherein the managing comprises detecting an abnormality and an attack on the disaggregated system using a security monitor connectable to the plurality of routers included in the interconnect.

3. The method of claim 1, wherein the configuring comprises generating the interconnect that connects the plurality of routers by configuring the hierarchical topology using a fat tree form, and
   the plurality of routers includes a root router and a leaf router.

4. A method of designing and implementing an interconnect for a disaggregated system, the method comprising:
   configuring the interconnect for the disaggregated system using a hierarchical topology; and
   managing components of the disaggregated system through a plurality of routers included in the configured interconnect,
   wherein the configuring comprises generating the interconnect that connects the plurality of routers by configuring the hierarchical topology using a fat tree form, and
   the plurality of routers includes a root router and a leaf router, and
   wherein the configuring comprises configuring a topology by initializing the root router to the leaf router through an operation of sending an initialization command from the root router to the leaf router, emptying a message queue of the root router in response to initializing leaf router information stored in the root router and then initializing a state of the root router, and inspecting a status of the initialized root router to determine an abnormality status, and by registering information of routers connected to the interconnect.

5. The method of claim 4, wherein the configuring comprises sending a router ID assignment request packet from a router connected to the interconnect to each router, detecting a newly connected leaf router at the root router in response to the sent router ID assignment request packet reaching the root router, assigning a router ID to the detected leaf router, recording the assigned router ID in a response packet and sending the same to the detected leaf router, and storing the assigned router ID and router information in the root router.

6. The method of claim 5, wherein the configuring comprises configuring a routing table using a manual routing method of specifying a route to a destination or an automatic routing method of searching for a route by traversing a fat-tree topology in reverse order, while starting from the leaf router.

7. The method of claim 1, wherein the managing comprises performing pool initialization through initialization of the pool controller and components included in the pool controller, assigning a component ID to each component in response to a component ID assignment request sent from a component classified in the pool using the pool controller, sending a response packet that includes the assigned component ID to the component, storing component information acquired from a packet related to the component ID assignment request, and notifying an upper router of the stored component information.

8. The method of claim 7, wherein the managing comprises verifying whether a destination component is included in the pool configured by the pool controller using a packet sent from a departure component, using the pool controller, and delivering the packet sent from the departure component to the destination component when the destination component is verified to be present in the pool configured by the pool controller.

9. The method of claim 8, wherein the managing comprises delivering the packet sent from the departure component to the upper router when the destination component is verified to be absent in the pool configured by the pool controller.

10. The method of claim 2, wherein the detecting comprises initializing the security monitor by reading a storage device connected to the security monitor and by loading a threat detection pattern.

11. The method of claim 2, wherein the detecting comprises performing an access key verification on a packet input to the security monitor by storing access key information in the security monitor.

12. The method of claim 2, wherein the detecting comprises performing a cyclic redundancy check (CRC) verification by calculating a CRC value of the entire packet or a designated region and by comparing a CRC hash value stored in a field of the packet and the calculated CRC value.

13. The method of claim 2, wherein the detecting comprises detecting an abnormal packet using a combination and values of specific fields of a packet as a pattern.

14. A computer system to design and implement an interconnect for a disaggregated system, the computer system comprising:

at least one processor configured to execute computer-readable instructions included in a memory, wherein the at least one processor is configured to configure the interconnect for the disaggregated system using a hierarchical topology and to manage components of the disaggregated system through a plurality of routers included in the configured interconnect, wherein the at least one processor is configured to manage the components by configuring a pool by classifying the components of the disaggregated system by type through a role of a pool controller that is performed by a leaf router of the interconnect and managing the pool according to characteristics of the components classified in the configured pool.

* * * * *